(12) United States Patent
Chacko

(10) Patent No.: US 11,449,922 B2
(45) Date of Patent: Sep. 20, 2022

(54) SYSTEM AND METHOD FOR DYNAMICALLY RECOMMENDING A PERSONALIZED PAYMENT OPTION TO A USER

(71) Applicant: TOSHIBA TEC KABUSHIKI KAISHA, Tokyo (JP)

(72) Inventor: Raison Chacko, Karnataka (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/100,660

(22) Filed: Nov. 20, 2020

(65) Prior Publication Data

US 2021/0295411 A1  Sep. 23, 2021

(30) Foreign Application Priority Data

Mar. 19, 2020 (IN) .............................. 202041011837

(51) Int. Cl.
| | | |
|---|---|---|
| *G06Q 30/00* | (2012.01) | |
| *G06Q 30/06* | (2012.01) | |
| *G06Q 30/02* | (2012.01) | |
| *G06Q 20/40* | (2012.01) | |
| *G06Q 20/20* | (2012.01) | |
| *G06Q 20/36* | (2012.01) | |
| *G06Q 20/10* | (2012.01) | |
| *G06Q 40/02* | (2012.01) | |
| *G06Q 20/34* | (2012.01) | |

(52) U.S. Cl.
CPC ....... *G06Q 30/0631* (2013.01); *G06Q 20/108* (2013.01); *G06Q 20/202* (2013.01); *G06Q 20/204* (2013.01); *G06Q 20/34* (2013.01); *G06Q 20/36* (2013.01); *G06Q 20/405* (2013.01); *G06Q 30/0222* (2013.01); *G06Q 30/0234* (2013.01); *G06Q 30/0235* (2013.01); *G06Q 30/0238* (2013.01); *G06Q 40/02* (2013.01)

(58) Field of Classification Search
None
See application file for complete search history.

(56) References Cited

U.S. PATENT DOCUMENTS

| | | | | |
|---|---|---|---|---|
| 2009/0018923 | A1* | 1/2009 | Chen | G06Q 20/105 705/40 |
| 2013/0282533 | A1* | 10/2013 | Foran-Owens | G06Q 30/0641 705/27.1 |
| 2014/0129357 | A1* | 5/2014 | Goodwin | G06Q 20/227 705/16 |

(Continued)

*Primary Examiner* — Matthew T Sittner
(74) *Attorney, Agent, or Firm* — Foley & Lardner LLP

(57) ABSTRACT

A method of providing a personalized payment option for a user includes (a) receiving billing information from a merchant server associated with a merchant, (b) obtaining one or more rules associated with the merchant, (c) obtaining one or more offers associated with one or more payment options associated with the user and a plurality of preferences associated with the user, (d) computing a reward associated with each of the one or more payment options based on the one or more offers, the billing information, the plurality of preferences, and the one or more rules, and (e) providing at least one recommended payment option among the one or more payment options based on the computed reward associated with each of the one or more payment options.

10 Claims, 11 Drawing Sheets

(56) References Cited

U.S. PATENT DOCUMENTS

| | | | |
|---|---|---|---|
| 2014/0149198 A1* | 5/2014 | Kim | G06Q 20/204 |
| | | | 705/14.27 |
| 2014/0379453 A1 | 12/2014 | Booth | |
| 2016/0180368 A1 | 6/2016 | Booth | |
| 2017/0193485 A1* | 7/2017 | Wu | G06Q 30/0226 |
| 2018/0137484 A1* | 5/2018 | Laracey | G06Q 20/3276 |
| 2019/0139019 A1* | 5/2019 | Bloys | G06Q 20/387 |
| 2019/0139074 A1* | 5/2019 | Tan | G06Q 30/0234 |
| 2019/0362414 A1* | 11/2019 | Viegas | G06Q 30/0641 |

* cited by examiner

REGISTRATION INFORMATION 401

1. Name of the user: "USER - A"

2. Mobile number: "9478530120"

3. Payment options:

| Name and Type | Validity | Transaction Limit |
|---|---|---|
| a. Credit Card - A | 06/2022 | 50000$ per month |
| b. Credit Card - B | 07/2023 | 25000$ per month |
| c. Debit Card - C | 01/2020 | 10000$ per day |
| d. Credit Card - L | 03/2021 | 10000$ per month |
| e. e-wallet - D | Nil | 5000$ per day |
| f. e-wallet - A | 09/2020 | 16000$ per month |
| g. Loyalty card - A | 02/2023 | 50 points per purchase |

Fig.4a

CONFIGURATION INFORMATION 402

1. Name of the user: "USER - A"

2. Mobile number: "9478530120"

3. Preferences:

a. Use Credit Card – A for transactions above 25000$
    b. Use Credit Card – B for transactions below 10000$
    c. Use Debit Card – C when the discount is greater than 5%
    d. Use Credit Card – L when movie ticket is issued as an offer
    e. Use e-wallet – D when shopping vouchers is issued as an offer
    f. Use e-wallet – A for transactions at Store – B and Store - L
    g. Use Loyalty card – A at the Store -A.
    h. In case of conflict in the preference choose the payment option with maximum monetary value.

4. Offers:
    a. Receive 10% discount for first two transactions made between 15th March to 30th Mach of 2020 using Credit Card – B.
    b. Receive 2x reward points at the Store - B using e-wallet – A.

Fig.4b

BILLING INFORMATION 403

MERCHANT NAME: "Merchant -1"
MERCHANT LOCATION: "Location -A"
USER NAME: "User - 1"
USER MOBILE NUMBER: "7486513420"

| Sl. No. | Goods Name | Category | Cost |
|---|---|---|---|
| 1. | ITEM-A | Grocery | 12$ |
| 2. | ITEM-B | Clothing | 150$ |
| 3. | ITEM-C | Grocery | 64$ |
| 4. | ITEM-D | Utensils | 349$ |
| 5. | ITEM-E | Medicine | 73$ |

Total : 648$

Fig.4c

RULES 405

USER -1

1. Shop for 330$ from Grocery and get 100 points.

2. Redeem 150 points for goods from "Clothing" category.

3. Accept payment through any mode.

4. 70% transactions are done using "Credit Card – B"

USER -N

1. Shop for 500$ and above and get 10$ cashback.

2. Pay 1220$ is cash and get 20 points.

3. Accept cash and e-wallet based payment modes only.

Fig.4e

| OFFERS 406 |
|---|
| 1. Make a single purchase for 1000$ or more using the Credit card -L at the Store -A in Location -1 between 10<sup>th</sup> March and 15 March 2020 and get 10$ cash back.<br><br>2. Make a single purchase of 3000$ at Store -B in any location during the month of April 2020, in Apparel category and get 5% discount with a maximum discount of 200 Dollar.<br><br>3. Make a single payment of 1000$ or more at Store - C and get 10% cash back with a maximum cashback of 150$ using an e-wallet – C. |

Fig.4f

| PREFERENCES 407 |
|---|
| PAYMENT OPTIONS PRIORITY<br><br>1. CREDIT CARD – A<br><br>2. E-WALLET – C<br><br>3. DEBIT CARD – G |
| OFFERS PRIORITY<br><br>1. CASHBACK<br><br>2. REWARD POINTS<br><br>3. SHOPPING VOCHERS |
| CHOICES<br><br>1. For CREDIT CARD – A, a shopping voucher offer is preferred.<br><br>2. E-WALLET – C, a cashback reward is preferred<br><br>3. DEBIT CARD – G is preferred for discount greater than 5%. |

Fig.4g

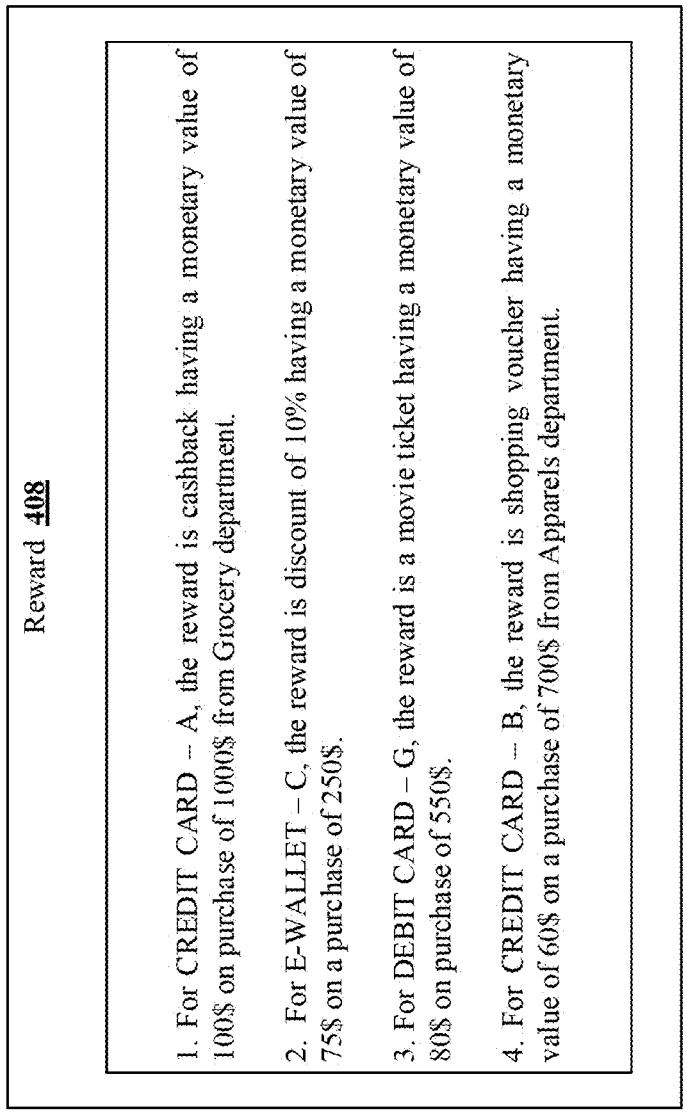

Reward 408

1. For CREDIT CARD – A, the reward is cashback having a monetary value of 100$ on purchase of 1000$ from Grocery department.

2. For E-WALLET – C, the reward is discount of 10% having a monetary value of 75$ on a purchase of 250$.

3. For DEBIT CARD – G, the reward is a movie ticket having a monetary value of 80$ on purchase of 550$.

4. For CREDIT CARD – B, the reward is shopping voucher having a monetary value of 60$ on a purchase of 700$ from Apparels department.

Fig.4h

SYSTEM AND METHOD FOR DYNAMICALLY RECOMMENDING A PERSONALIZED PAYMENT OPTION TO A USER

CROSS-REFERENCE TO RELATED APPLICATION

This application is based on and claims the benefit of priority from Indian Patent Application No. 202041011837, filed on Mar. 19, 2020, the entire contents of which are incorporated herein by reference.

FIELD

The present subject matter generally relates to data processing for product selection. More particularly, but not exclusively, the present disclosure discloses a method and a system for assisting a user in real-time for selecting products.

BACKGROUND

Users typically have a variety of payment options while initiating a transaction with a merchant, including cash, internet banking, gift cards, credit cards, debit cards, e-wallet application and the like. The payment options, such as credit or debit cards, may be issued by an issuer in correspondence with the merchants including financial institutions, retail stores, gas stations, airlines, and the like. The merchants that issue the payment option provide promotions or offers such as reward points, travel miles, cashback bonuses, product or store discounts, free gifts, or the like. Further, the merchants may accept multi tender payments. For example, a bill paid through one or more payment options.

Users may find it difficult to remember the offers associated with the payment options. Further, when a multi tender is accepted by the merchant the user may not be able to determine the combination of the payment options that maximize the profitability (savings) to the user.

The information disclosed in this background of the disclosure section is only for enhancement of understanding of the general background of the invention and should not be taken as an acknowledgement or any form of suggestion that this information forms the prior art already known to a person skilled in the art.

SUMMARY

Other embodiments and aspects of the disclosure are described in detail herein and are considered a part of the claimed disclosure.

Disclosed herein is a method of providing a personalized payment option for a user. The method comprises receiving billing information from a merchant server associated with a merchant. Further, the method comprises obtaining one or more rules associated with the merchant. Furthermore, the method comprises obtaining one or more offers associated with one or more payment options associated with the user and a plurality of preferences associated with the user. Thereafter, the method comprises computing a reward associated with each of the one or more payment options based on the one or more offers, the billing information, the plurality of preferences, and the one or more rules. Finally, the method comprises providing at least one recommended payment option among the one or more payment options based on the computed reward associated with each of the one or more payment options.

In an embodiment, the present disclosure discloses a server, for providing a personalized payment option for a user. The server comprises at least one processor and a memory communicatively coupled to the at least one processor. The memory stores processor-executable instructions, which, on execution, causes the at least one processor to receive billing information from a merchant server associated with a merchant. Further, the instructions cause the at least one processor to obtain one or more rules associated with the merchant. Furthermore, the instructions cause the at least one processor to obtain one or more offers associated with one or more payment options associated with the user and a plurality of preferences associated with the user. Thereafter, the instructions cause the at least one processor to compute a reward associated with each of the one or more payment options based on the one or more offers, the billing information, the plurality of preferences, and the one or more rules. Finally, the instructions cause the at least one processor to provide at least one recommended payment option among the one or more payment options based on the computed reward associated with each of the one or more payment options.

Embodiments of the present disclosure discloses a non-transitory computer readable medium including instructions stored thereon that when processed by at least one processor cause a device to perform operations comprising (a) receiving billing information from a merchant server associated with a merchant, (b) obtaining one or more rules associated with the merchant, (c) obtaining one or more offers associated with one or more payment options associated with the user and a plurality of preferences associated with the user, (d) computing a reward associated with each of the one or more payment options based on the one or more offers, the billing information, the plurality of preferences, and the one or more rules, and (e) providing at least one recommended payment option among the one or more payment options based on the computed reward associated with each of the one or more payment options.

The foregoing summary is illustrative only and is not intended to be in any way limiting. In addition to the illustrative aspects, embodiments, and features described above, further aspects, embodiments, and features may become apparent by reference to the drawings and the following detailed description.

DESCRIPTION OF THE DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4a shows an exemplary registration information received by the server in accordance with some embodiments of the present disclosure;

FIG. 4b shows an exemplary configuration information received by the server in accordance with some embodiments of the present disclosure;

FIG. 4c shows an exemplary billing information received by the server in accordance with some embodiments of the present disclosure;

FIG. 4e shows an exemplary one or more rules associated with the merchant in accordance with some embodiments of the present disclosure;

FIG. 4f shows an exemplary one or more offers associated with one or more payment options in accordance with some embodiments of the present disclosure;

FIG. 4g shows an exemplary plurality of preferences associated with the user in accordance with some embodiments of the present disclosure;

FIG. 4h shows an exemplary reward associated with one or more payment options in accordance with some embodiments of the present disclosure;

DETAILED DESCRIPTION

Figure 1:
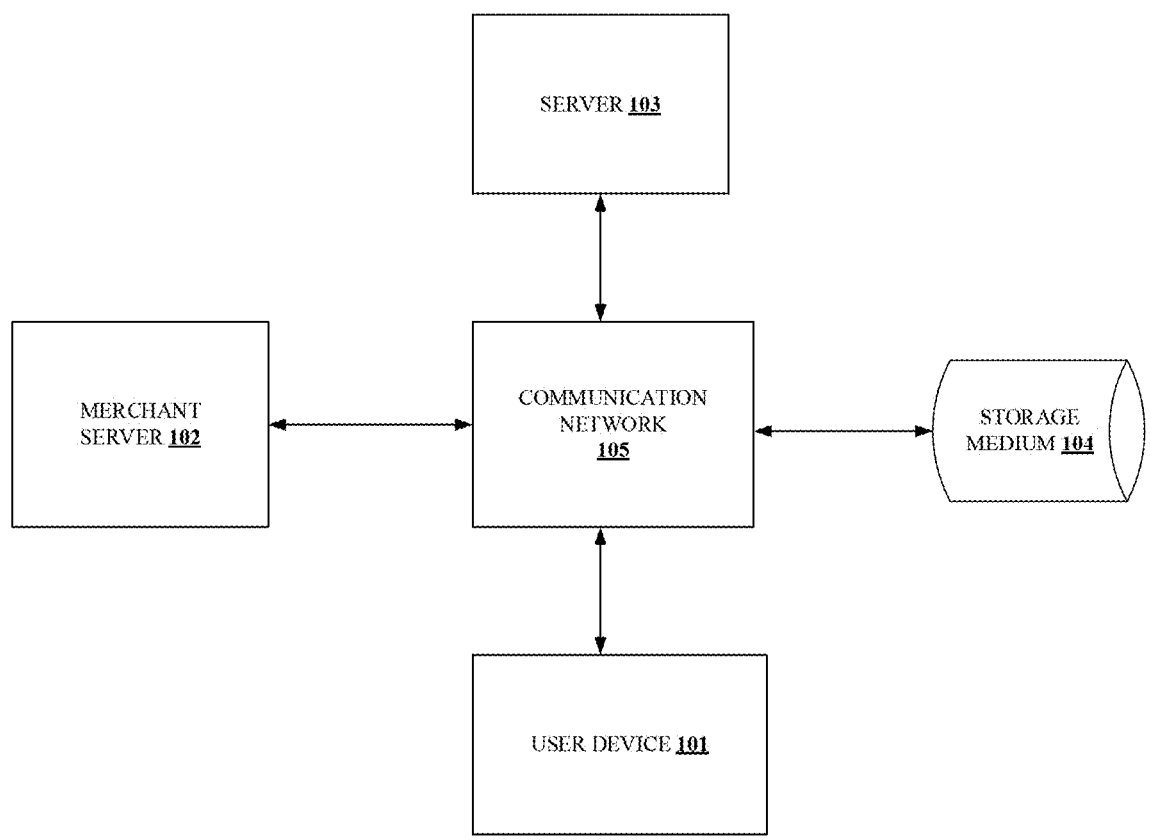
FIG. 1 illustrates an exemplary environment for recommending a personalized payment option to a user in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment for recommending a personalized payment option to a user in accordance with some embodiments of the present disclosure.

The present disclosure relates to a method of recommending a personalized payment option to a user. In an embodiment, to receive a recommendation regarding the personalized payment option, the user may register via the user device (101) with the server (103). The user device (101) may include at least one of a smartphone, a tablet computer, a desktop computer, a user wearable device and the like. The user may register with the server (103) using a software application or a web browser application installed in the user device (101). In an embodiment, the server (103) receives a registration information from the user including a consent for providing the recommendation to the user. The registration information includes at least one of a name of the user, a mobile number of the user, the one or more payment options associated with the user, a type of the one or more payment options, a validity associated with the one or more payment options, and a transaction limit associated with the one or more payment options. For example, the registration information received from the user is as shown:

Name of the user: "USER—A"

Mobile number: "7314985360"

Payment options: [Debit Card—A, Credit Card—L, cash, e-wallet application—B]

Type: [Card—"Category—1", Card—"Category—3", Currency,]

Validity: [02/2024, 03/2020, Nil, 05/2026]

Transaction Limit: [$10000, $25000, $5000, $2100].

Where the "Category—1" indicates a platinum card, "Category—3" indicates a titanium card and the like. The "Category" of the card may be specified by the issuer. The server (103) stores the registration information in a storage medium associated with the server (103). The server (103) registers the user for recommending the personalized payment option. Further, the server (103) receives a user input including a configuration information from the user via the user device (101). The configuration information includes at least one of a plurality of preferences associated with the user and one or more offers associated with the one or more payment options associated with the user. The received configuration information is stored or updated by the server (103) in the storage medium. For example, the configuration information received from the user is as shown:

Preferences: [Use Debit Card—A for payment at Store—B, Use Credit Card—L for payments above $1500, use cash at Store—5 for points, use e-wallet application—B for payments below $4000], Offers: [Shopping Voucher for three transactions using Credit Card—L, Two movie tickets for transaction at a supermarket—1, $10 cashback for a first transaction at Store—B].

In an embodiment, after the user registers with the server (103) for recommending the personalized payment option, the user may periodically update the configuration information with the server. Further, when the user is willing to purchase one or more goods from a merchant, the user receives the personalized payment option during at least one of checkout or billing. The merchant may be at least one of a physical store, an e-commerce application and the like. In an embodiment, the server (103) receives a billing information associated with the user from a merchant server (102) associated with the merchant. For example, the billing information may be as shown:

Name of the User: "USER—1"

Name of the Merchant: "MERCHANT—1"

Goods Purchased: ["Item—1 for $23", "Item—2 for $50"]

Total Amount: "$73".

In an embodiment, after receiving the billing information, the server (103) obtains one or more rules associated with the merchant. The one or more rules may be stored in the merchant server (102) and provided to the server (103) based on a request. The one or more rules may be specific to the user or generalized to all customers of the store. For example, one or more rules may be as shown:

Accepted Payment Mode: [Credit card, debit card, Cash]

Incentives: [100 points on a purchase of Grocery worth $400].

Further, the server (103) obtains one or more offers associated with one or more payment options of the user and the plurality of preferences associated with the user. The plurality of preferences is obtained from the storage medium. The one or more offers may be obtained dynamically from one or more issuer servers (not shown in Figure). The one or more issuer servers may be associated with one or more issuers. The issuers are associated with the one or more payment options of the user. For example, an "Issuer—1" may be associated with the "Credit Card—L" of the user. The server (103) obtains the one or more offers from the one or more issuer servers associated with the "Issuer—1". In another embodiment, the server (103) may periodically obtain the one or more offers from the one or more issuer servers and store the one or more offers in the storage medium. For example, one or more offers is as shown:

Offers: ["1 reward point for every $5 spent using the "Credit Card—L" up to $5000 and 1 reward point=$0.25", "2% cashback for first 3 transactions using the "Debit Card—B"].

In an embodiment, the server (103) computes a reward associated with each of the one or more payment options based on the one or more offers, the billing information, the plurality of preferences, and the one or more rules. The person skilled in the art appreciates the use of one or more existing statistical techniques and/or Artificial Intelligence (AI) based techniques to compute the reward. The reward may be indicative of a monetary value to be received by the user upon performing the transaction using the one or more payment options. Further, the computed reward may be ranked based on the monetary value. For example, the computed reward is as shown:

Reward: ["Using Debit Card—A get a reward of $35", "Using Credit Card—L get a reward of $28", "Using cash get a reward of $15", "Using e-wallet application—B get a reward of $12"].

In an embodiment, the server (103) provides the one or more payment options based on the computed reward as a recommendation to the user. The server (103) provides the one or more payment options as the personalized payment option as the recommendation to the user via at least one of the user device (101), a Point-of-Sale (PoS) (e.g., a PoS device), and a display device associated with the PoS and the like. For example, the personalized payment option recommended to the user is as shown:

Recommendation: [1. "Pay $25 using Debit Card—A and $30 using Credit Card—L and $18 using cash and get a reward of "$18 cash back and a free shopping voucher worth $20", 2. "Pay $73 using Debit Card—A and get a cashback of "$35"].

Further, the user completes a transaction using the recommended one or more payment options.

In an embodiment, the user device (101), the merchant server (102), the server (103), and the storage medium may be connected to each other via a communication network (105). The communication network (105) may include, for example, a direct interconnection, enterprise network, a Peer to Peer (P2P) network, Local Area Network (LAN), Wide Area Network (WAN), wireless network (e.g., using Wireless Application Protocol (WAP)), the Internet, Wireless Fidelity (Wi-Fi), cellular network, and the like. Further, the storage medium may be at least one of a database, a pen drive, a hard disk, a compact disk, and the like. The storage medium may be external to the server (103) or stored in a memory of the server (103).

Figure 2:
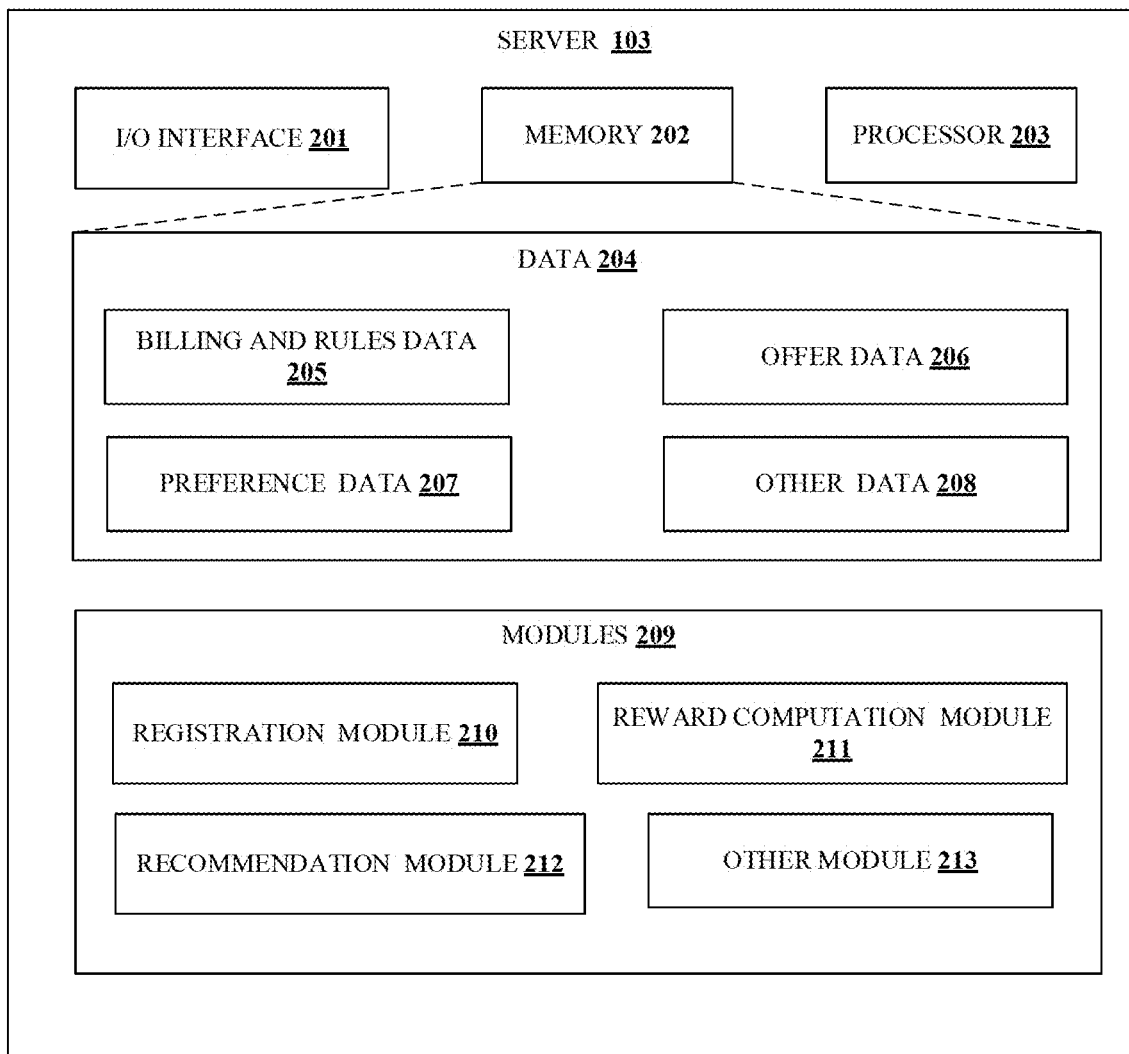
FIG. 2 shows a detailed block diagram of a server in accordance with some embodiments of the present disclosure.

FIG. 2 shows a block diagram of the server (103) for recommending a personalized payment option to a user in accordance with some embodiments of the present disclosure.

The server (103) may include a Central Processing Unit ("CPU" or "processor"), shown as processor (203), and a memory (202) storing instructions executable by the processor (203). The processor (203) may include at least one data processor for executing program components for executing user or system-generated requests. The memory (202) may be communicatively coupled to the processor (203). The computing system (103) further includes an Input/Output (I/O) interface (201). The I/O interface (201) may be coupled with the processor (203) through which an input signal or/and an output signal may be communicated. In one embodiment, the one or more parameters may be received through the I/O interface (201).

In some implementations, the computing system (103) may include data (204) and modules (208). As an example, the data (204) and the modules (208) may be stored in the memory (202) configured in the computing system (103). In one embodiment, the data (204) may include, for example, billing and rules data (205), offer data (206), a preference data (207), and other data (208). In the illustrated FIG. 2, data (204) are described herein in detail.

In an embodiment, the billing, and rules data (205) includes billing information and the one or more rules associated with the merchant. The billing information includes at least one of at least one of a name of the merchant, a location of the merchant, a name of the user, a mobile number of the user, one or more goods purchased by the user, and a category of the one or more goods. The one or more rules includes at least one of one or more incentives offered by the merchant, the payment transaction history of the user performed with the merchant, and the one or more modes of payment accepted by the merchant.

In an embodiment, the offer data (206) includes the one or more offers associated with the one or more payment options associated with the user. The one or more offers includes at least one of one or more rebates offered by an issuer associated with each of the one or more payment options, an expiry of the one or more rebates, and one or more limitations associated with the one or more rebates from at least one of a storage medium associated with the server (103) and one or more issuer servers associated with the issuer.

In an embodiment, the preference data (207) includes the plurality of preferences associated with the user. The plurality of preferences includes at least one of a first priority associated with the one or more payment options, a second priority associated with the one or more offers, and one or more choices associated with a combination of the one or more payment options and the one or more offers.

In an embodiment, the other data (208) may include the registration information. The registration information includes at least one of the name of the user, the mobile number of the user, the one or more payment options associated with the user, the type of the one or more payment options, the validity associated with the one or more payment options, and the transaction limit associated with the one or more payment options.

In some embodiments, the data (204) may be stored in the memory (202) in the form of various data structures. Additionally, the data (204) may be organized using data models, such as relational or hierarchical data models. The other data (208) may store data, including temporary data and temporary files, generated by the modules (209) for performing the various functions of the server (103).

In some embodiments, the data (204) stored in the memory (202) may be processed by the modules (209) communicatively coupled to the processor (203) of the computing system (103). The modules (209) may be stored within the memory (202). In one embodiment, the modules (209) may be present outside the memory (202) as shown in FIG. 2 and implemented as hardware. As used herein, the term modules (209) may refer to an Application Specific Integrated Circuit (ASIC), a FPGA (Field Programmable Gate Array), an electronic circuit, a processor (shared, dedicated, or group) that execute one or more software or firmware programs, a combinational logic circuit, and/or other suitable components that provide the described functionality.

In one implementation, the modules (209) may include, for example, a registration module (210), a reward computation module (211), a recommendation module (212), and one or more other modules (213). It may be appreciated that such aforementioned modules (209) may be represented as a single module or a combination of different modules.

In an embodiment, the registration module (210) is configured to receive a registration information from the user via the user device (101) including the consent for providing the recommendation regarding the personalized payment option to the user for completing the transaction. The registration information is received one time and stored in the storage medium or the other data (208). Further, the registration module (210) is configured to receive the configuration information from the user via the user device (101). The registration module (210) further, updates the configuration information based on the user input received from the user device (101). The configuration information may be received periodically by the user or when the user receives one or more offers from at least one of the merchant and the issuer. The configuration information may be stored in the storage medium or the preference data (207) or offer data (206).

In an embodiment, the reward computation module (211) is used to compute the reward associated with each of the one or more payment options of the user. Further, the reward computation module (211) is used to verify a validity associated with one or more payment options. For example, verifying the expiry date of one or more payment cards registered by the user. Further, excluding one or more invalid payment options based on the verification. For example, if the "Credit card—A" expires on "12-05-2020", and one or more offers associated with the credit card indicates "Perform 2 transactions between 15 May 2020 and 30 May 2020 and get 10% discount", the "Credit card—A" may be regarded as the one or more invalid payment options. The reward computation module (211) upon verification of the one or more payment options, determines the monetary value associated with each of the valid one or more payment options based on at least one of the one or more offers, the billing information, and the one or more rules. The monetary value is indicative of the reward. For example, if a "Debit card—A" provides a movie ticket as the reward, the cost of the movie ticket is determined by the reward computation module (211). The cost of the movie ticket is the monetary value associated with the "Debit Card—A". Further, the valid one or more payment options are ranked based on the monetary value, and the plurality of preferences. For example, if the plurality of preferences of the user indicates a higher priority to "Debit card—A" and a lower priority to "Credit card—B", the reward determined for the "Debit card—A" is "$20" and the "Credit card—B" is "$25", the "Debit card—A" is ranked higher than the "Credit card—B" based on the plurality of preferences.

In an embodiment, the recommendation module (212) is configured to recommend the personalized payment option to the user. The recommendation module (212) identifies at least one of the one or more payment options with a maximum reward and a combination of the one or more payment options with the maximum reward. The person skilled in the art appreciates the use of one or more statistical techniques to identify the one or more payment options or the combination of the one or more payment options with the maximum reward. Further, the recommendation module (212) is configured to provide (e.g., recommend) at least one of the one or more payment options and the combination of the one or more payment options to the user as the personalized payment option.

In an embodiment, the other module (213) is configured to obtain the one or more rules, and the one or more offers. The other module (213) may receive in real-time the one or more rules comprising at least one of the one or more incentives offered by the merchant, the payment transaction history of the user performed with the merchant, and one or more modes of payment accepted by the merchant from one of the storage medium associated with the server (103) or the merchant server (102). Further, other module (213) may receive in real-time the one or more offers including at least one of the one or more rebates offered by the issuer associated with each of the one or more payment options, an expiry of the one or more rebates, and one or more limitations associated with the one or more rebates from at least one of a storage medium associated with the server (103) and one or more issuer servers associated with the issuer.

Figure 3:
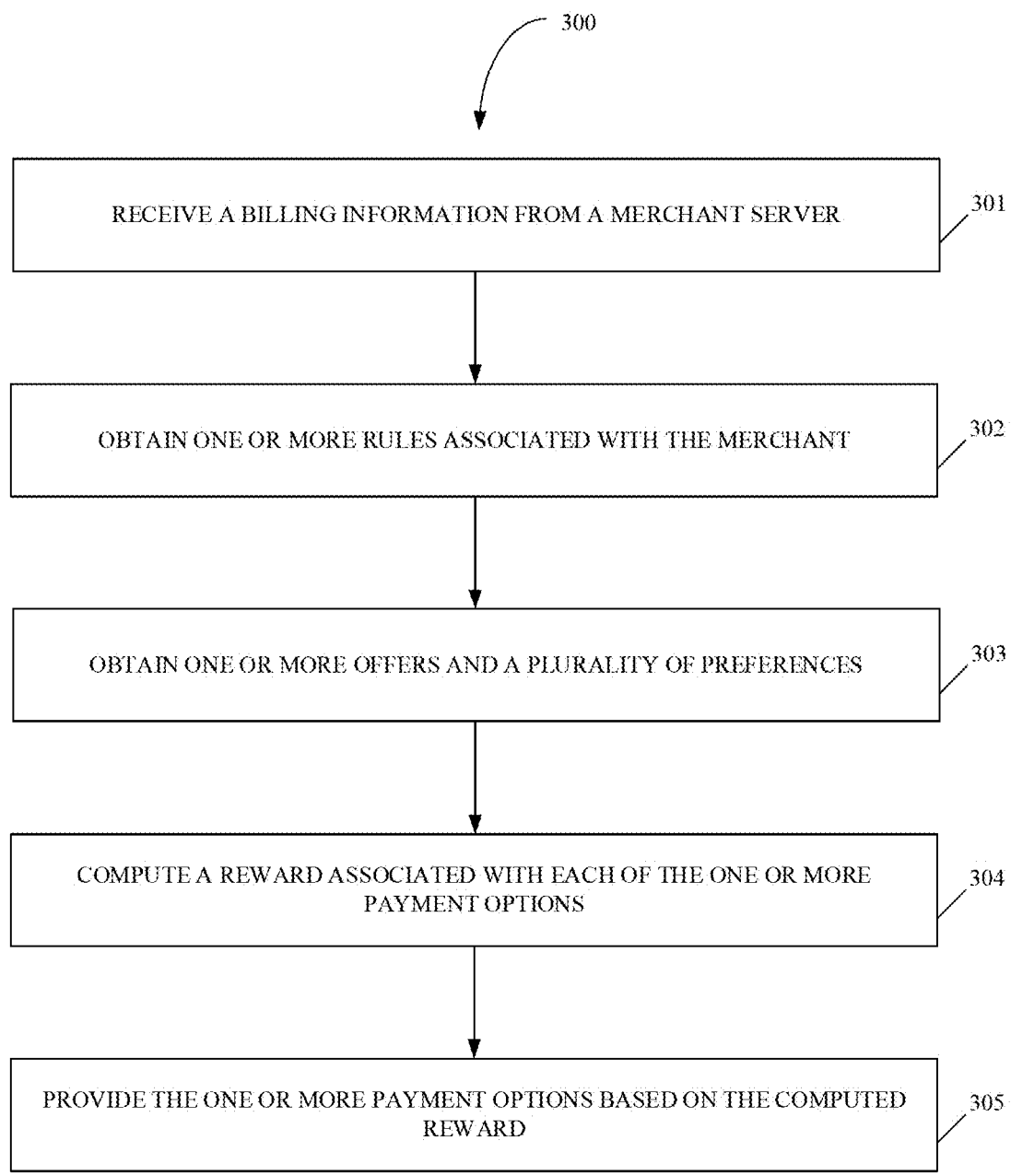
FIG. 3 shows a flowchart illustrating a process of recommending a personalized payment option to a user in accordance with some embodiments of the present disclosure.

FIG. 3 shows a flowchart illustrating a process of recommending a personalized payment option to a user in accordance with some embodiments of the present disclosure.

As illustrated in FIG. 3, the method 300 comprises one or more blocks for recommending a personalized payment option to a user. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method.

Additionally, individual blocks may be deleted from the methods without departing from the scope of the subject matter described herein. Furthermore, the method can be implemented in any suitable hardware, software, firmware, or combination thereof.

In an embodiment, the user willing to receive a recommendation regarding the personalized payment option registers with the server (103). The server (103) receives the registration information from the user via the user device (101) including the consent for providing the recommendation to the user for completing the transaction. The transaction herein refers to a payment made to the merchant by the user for purchasing one or more goods from the merchant. The registration information (401) includes at least one of the name of the user, the mobile number of the user, the one or more payment options associated with the user, the type of the one or more payment options, the validity associated with the one or more payment options, and the transaction limit associated with the one or more payment options as shown in FIG. 4a. The registration information (401) may be stored in the storage medium. Further, the one or more payment options include at least one of the payment card (for example, a credit card, a debit card, a gift card, a shopping card and the like), the card-on-file, the e-wallet application, the internet banking and currency-based money.

In an embodiment, the server (103) may receive and update the configuration information based on the user input from the user device (101). The configuration information (402) includes at least one of the plurality of preferences associated with the user and the one or more offers associated with the one or more payment options associated with the user as shown in FIG. 4b. For example, if a first preference from the plurality of the preferences conflicts with a second preference, the server (103) may select either the first preference or the second preference based on the maximum monetary value associated with the first preference and the second preference. The server (103) may periodically (for example, once every 10 days, once per month, and the like) receive updates regarding the configuration information (402) from the user device (101). In another embodiment, the server (103) may receive the configuration information (402) when the user receives a specific offer from the issuer of the one or more payment options to the user device (101).

At block 301, the method may comprise receiving the billing information from the merchant server (102) associated with the merchant.

Figure 4D:
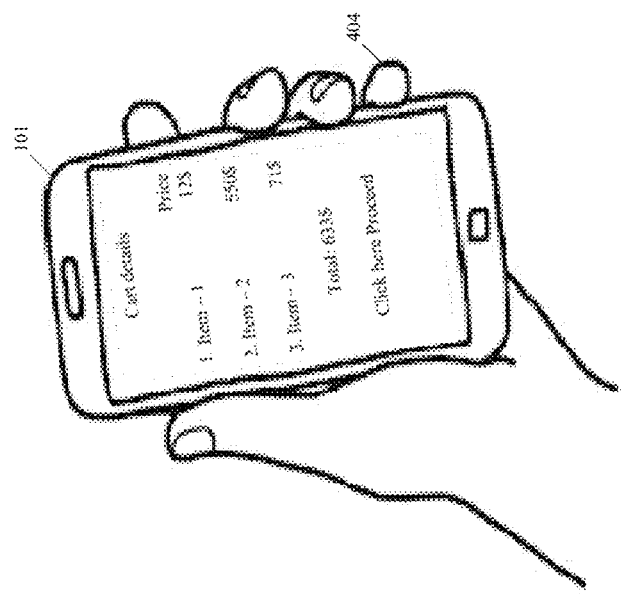
FIG. 4d shows an exemplary checkout of a user at a merchant in accordance with some embodiments of the present disclosure.
Figure 4D:
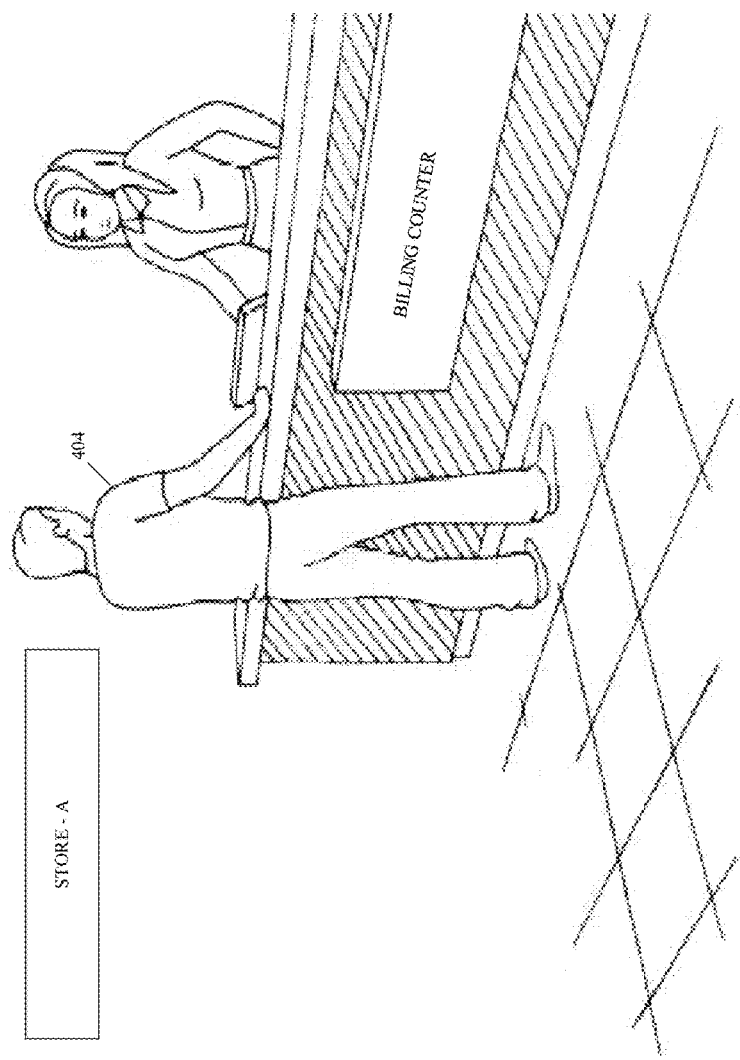

In an embodiment, the billing information (403) includes at least one of the name of the merchant, the location of the merchant, the name of the user, the mobile number of the user, the one or more goods purchased by the user, and the category of the one or more goods as shown in FIG. 4c. The merchant may include at least one of a physical store, e-commerce merchant and the like. The billing information (403) may be sent by the merchant server (102) to the server (103) during the checkout at the physical store or during the checkout in an e-commerce application as shown in FIG. 4d.

At block 302, the method may comprise obtaining the one or more rules associated with the merchant.

In an embodiment, the server (103) receives in real-time the one or more rules from the merchant server (102) associated with the merchant. The one or more rules (405) includes at least one of the one or more incentives offered by the merchant, the payment transaction history of the user (404) performed with the merchant (e.g., the transaction history between the user and the merchant), and the one or more modes of payment accepted by the merchant as shown in FIG. 4e. The one or more incentives may include discounts, free gifts, loyalty points, discount on redemption of the loyalty points, and the like offered by the merchant for the purchase of the one or more goods. The one or more rules (405) may be obtained from one of a storage medium associated with the server (103). The server (103) periodically receives and updates the one or more rules (405) from the merchant. In another embodiment, the server (103) may obtain the one or more rules (405) dynamically from the merchant server (102).

At block 303, the method may comprise obtaining the one or more offers associated with one or more payment options of the user and a plurality of preferences associated with the user.

In an embodiment, the server (103) receives in real-time the one or more offers from at least one of the storage medium associated with the server (103) and one or more issuer servers associated with the issuer. The one or more offers (406) include one of one or more rebates offered by the issuer associated with each of the one or more payment options, an expiry of the one or more rebates, and one or more limitations associated with the one or more rebates as shown in FIG. 4f. Further, the one or more offers (406) may include the one or more rebates offered by the issuer associated with the payment option applicable to all customers of the issuer and the one or more rebates offered by the issuer specific to the user (404).

In an embodiment, the server (103) receives the plurality of preferences (407) from the user periodically. The plurality of preferences (407) includes at least one of a first priority associated with the one or more payment options, a second priority associated with the one or more offers (406), and one or more choices associated with a combination of the one or more payment options and the one or more offers (406) as shown in FIG. 4g. The first priority is indicative of the preferred mode of payment by the user, for example, preferred credit card, e-wallet application, and the like. The second priority is indicative of the type of rebates preferred by the user, for example, cashback or movie tickets or discounts or shopping vouchers and the like. The one or more choices are indicative of preference specific to the merchant, or the one or more offers (406) by the issuer and the like. For example, the one or more choices may be to prefer shopping vouchers at store—A instead of discount, or to prefer loyalty points over cashback at store—B and the like.

At block 304, the method may comprise computing the reward associated with each of the one or more payment options based on the one or more offers (406), the billing information (403), the plurality of preferences (407), and the one or more rules (405).

In an embodiment, the server (103) may verify the validity associated with the one or more payment options received by the user. Further, the server (103) excludes the one or more invalid payment options based on the verification. For example, the Credit card—A expiring on June 2022 but the one or more offers (406) are valid for the month of July 2022 is excluded. Upon verification, the server (103) determines the monetary value associated with each of the valid one or more of payment options based on at least one of the one or more offers (406), the billing information (403), and the one or more rules (405). The monetary value is indicative of the reward (408) as shown in FIG. 4h. For example, the loyalty points of 50 for a transaction using the credit card—A is converted to the monetary value of $25 based on the relationship between the loyalty points and the monetary value indicated by the issuer as (1 loyalty point=$0.50). Furthermore, the server (103) ranks the valid one or more payment options based on the monetary value, and the plurality of preferences (407) as shown in FIG. 4h.

At block 305, the method may comprise providing the one or more payment options based on the computed reward (408) as a recommendation to the user, where the user completes a transaction using the recommended one or more payment options.

Figure 4I:
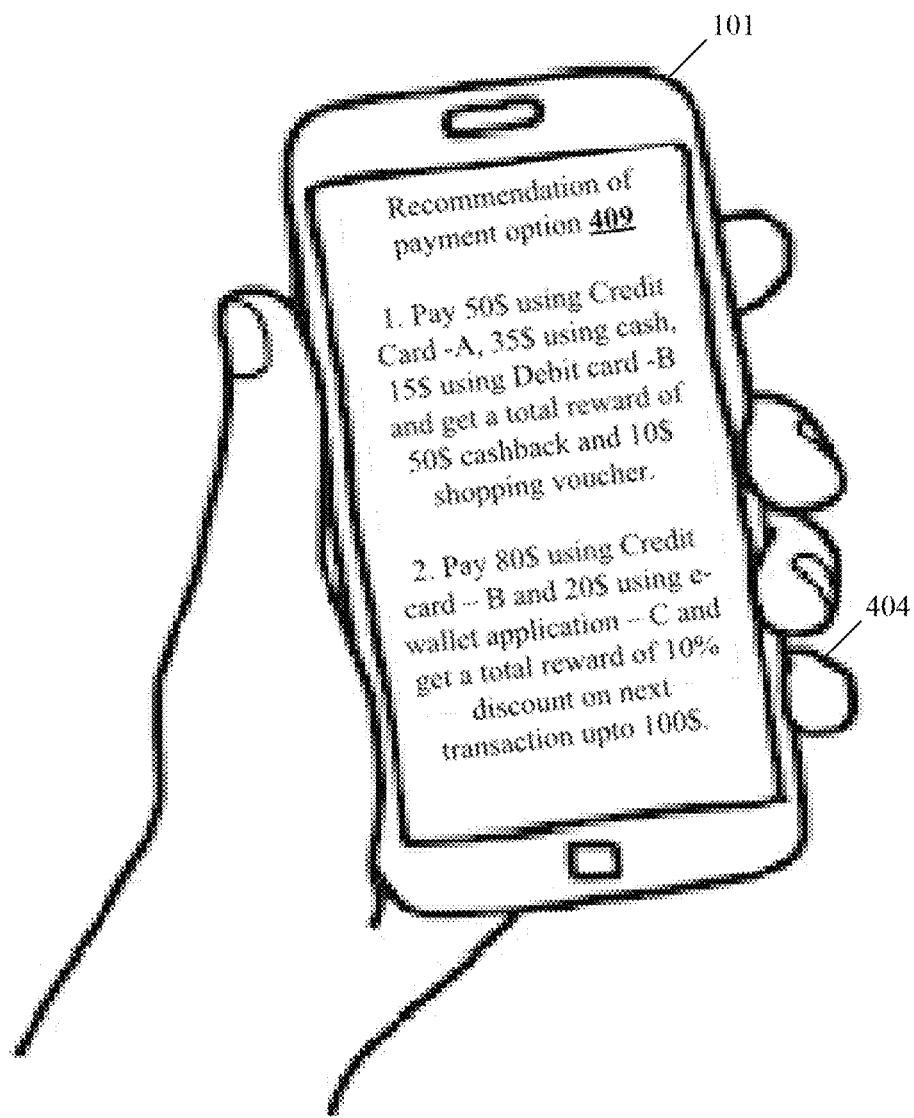
FIG. 4i shows an exemplary recommended payment option to a user in accordance with some embodiments of the present disclosure.

In an embodiment, the server (103) identifies at least one of the one or more payment options with the maximum reward (408) and the combination of the one or more payment options with the maximum reward (408). Further, the server (103) provides at least one of the one or more payment options and the combination of the one or more payment options to the user as a personalized payment option (409) as shown in FIG. 4i.

In an embodiment, the one or more payment options is recommended to the user using at least one of a user device (101), the Point-of-Sale (PoS), and a display device associated with the PoS. Further, based on the personalized payment option (409) recommended, the user completes the transaction using the recommended one or more payment options.

In an embodiment, the method of recommending the personalized payment option to the user provides one or more payment options or a combination of the one or more payment options with maximum reward (408). Further, the recommended payment option is specific to the user and ranked based on the plurality of user preferences (407). Further, the recommendation of the payment option is provided dynamically to the user in real-time. The recommendation of the payment option provides the maximum reward (408) to the user and eliminates the need for reward (408) computation by the user.

Computer System

Figure 5:
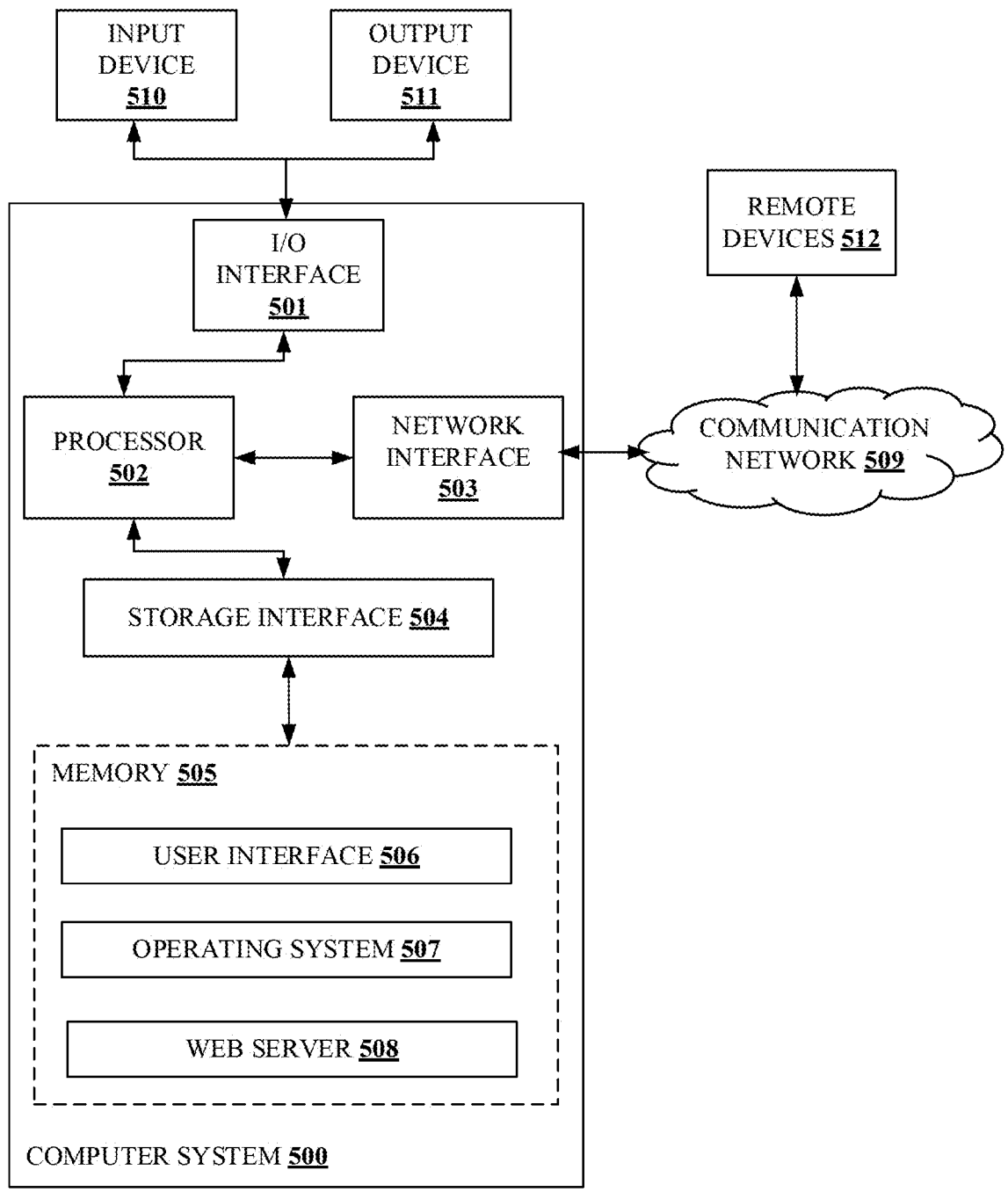
FIG. 5 illustrates a block diagram of an exemplary computer system for implementing embodiments consistent with the present disclosure It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

FIG. 5 illustrates a block diagram of an exemplary computer system (500) for implementing embodiments consistent with the present disclosure. In an embodiment, the computer system (500) may be used to implement the method for recommending a personalized payment option (409) to a user (404). The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via an I/O interface (501). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (501), the computer system (500) may communicate with one or more I/O devices. For example, the input device (510) may be an antenna, keyboard, mouse, joystick, remote control (e.g., an infrared remote control), camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (509) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (503) and the communication network (509), the computer system (500) may communicate with the one or more service operators.

In some embodiments, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, user interface (506), an operating system (507), web server (508) etc. In some embodiments, computer system (500) may store user/application data (506), such as the data, variables, records, etc. as described in this disclosure. Such databases may be implemented as fault-tolerant, relational, scalable, secure databases such as Oracle or Sybase.

The operating system (507) may facilitate resource management and operation of the computer system (500).

Examples of operating systems include, without limitation, APPLE® MACINTOSH® OS X®, UNIX®, UNIX-like system distributions (E. G., BERKELEY SOFTWARE DISTRIBUTION® (BSD), FREEBSD®, NETBSD®, OPENBSD, etc.), LINUX® DISTRIBUTIONS (E. G., RED HAT®, UBUNTU®, KUBUNTU®, etc.), IBM®OS/2®, MICROSOFT® WINDOWS® (XP®, VISTA®7/8, 10 etc.), APPLE® IOS®, GOOGLE™ ANDROID™, BLACKBERRY® OS, or the like.

In some embodiments, the computer system (500) may implement a web browser (not shown in the Figure) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (508) may utilize facilities such as AJAX, HTML, ADOBE® FLASH®, JAVASCRIPT®, JAVA®, Application Programming Interfaces (APIs), etc. In some embodiments, the computer system (500) may implement a mail server stored program component not shown in the Figure). The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (500) may implement a mail client stored program component not shown in the Figure). The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium (103) refers to any type of physical memory on which information or data readable by a processor may be stored. Thus, a computer-readable storage medium (103) may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In some implementation, the billing information (403), the one or more rules (405), the one or more offers (406), and the plurality of preferences (407) may be received from the remote devices (512). In an embodiment, the remote devices (512) may be the user device (101).

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

| REFERENCE NUMERALS: | |
| --- | --- |
| Reference number | Description |
| 101 | User Device |
| 102 | Merchant Server |

-continued

| REFERENCE NUMERALS: | |
|---|---|
| Reference number | Description |
| 103 | Server |
| 104 | Storage Medium |
| 105 | Communication Network |
| 201 | I/O Interface |
| 202 | Memory |
| 203 | Processor |
| 204 | Data |
| 205 | Billing and rules Data |
| 206 | Offer Data |
| 207 | Preference data |
| 208 | Other Data |
| 209 | Modules |
| 210 | Registration Module |
| 211 | Reward Computation Module |
| 212 | Recommendation Module |
| 213 | Other Module |
| 401 | Registration Information |
| 402 | Configuration Information |
| 403 | Billing information |
| 404 | User |
| 405 | Rules |
| 406 | Offers |
| 407 | Preferences |
| 408 | Reward |
| 409 | Payment option |
| 500 | Computer System |
| 501 | I/O interface |
| 502 | Processor |
| 503 | Network Interface |
| 504 | Storage Interface |
| 505 | Memory |
| 506 | User Interface |
| 507 | Operating System |
| 508 | Web Server |
| 509 | Communication Network |
| 510 | Input Device |
| 511 | Output Device |
| 512 | Remote Devices |

What is claimed is:

1. A method of providing a personalized payment option for a user, the method comprising:
    receiving, by a server, billing information from a merchant server associated with a merchant;
    obtaining, by the server, one or more rules associated with the merchant;
    obtaining, by the server, one or more offers associated with one or more payment options associated with the user and a plurality of preferences associated with the user;
    computing, by the server, a reward associated with each of the one or more payment options based on the one or more offers, the billing information, the plurality of preferences, and the one or more rules;
    analyzing, by the server, the one or more payment options to identify a combination of the one or more payment options providing a maximum reward based on the computed reward associated with each of the one or more payment options; and
    causing, by the server, a device associated with the user to display a recommendation for the user to complete a transaction using the identified combination of the one or more payment options providing the maximum reward,
    wherein the recommendation identifies (a) a first portion of the transaction that should be completed using a first payment option of the identified combination and (b) a second portion of the transaction that should be completed using a second payment option of the identified combination.

2. The method of claim 1, wherein the billing information comprises at least one of a name of the merchant, a location of the merchant, a name of the user, a mobile number of the user, one or more goods purchased by the user, or a category of the one or more goods.

3. The method of claim 1, wherein obtaining the one or more rules comprises:
    receiving, in real-time from one of a storage medium associated with the server or the merchant server, at least one of (a) one or more incentives offered by the merchant, (b) a payment transaction history between the user and the merchant, or (c) one or more modes of payment accepted by the merchant.

4. The method of claim 1, wherein obtaining the one or more offers comprises:
    receiving, in real-time from at least one of a storage medium associated with the server or one or more issuer servers, at least one of (a) one or more rebates offered by an issuer associated with each of the one or more payment options, (b) an expiry of the one or more rebates, or (c) one or more limitations associated with the one or more rebates.

5. The method of claim 1, wherein the plurality of preferences comprises at least one of (a) a first priority associated with the one or more payment options, (b) a second priority associated with the one or more offers, or (c) one or more choices associated with a combination of the one or more payment options and the one or more offers.

6. The method of claim 1, wherein computing the reward comprises:
    verifying a validity associated with the one or more payment options;
    excluding one or more invalid payment options based on the verification;
    determining, upon verification, a monetary value associated with each of the one or more valid payment options based on at least one of the one or more offers, the billing information, or the one or more rules; and
    ranking the one or more valid payment options based on the monetary value and the plurality of preferences, wherein the monetary value is indicative of the reward.

7. The method of claim 1, wherein the one or more payment options comprises at least one of a payment card, a card-on-file, an e-wallet application, internet banking, or currency-based money.

8. The method of claim 1, wherein the device associated with the user includes at least one of a user device, a Point-of-Sale (PoS) device, or a display device associated with the PoS device.

9. The method of claim 1, further comprising:
    receiving registration information of the user including consent for providing the at least one recommended payment option, wherein the registration information comprises at least one of a name of the user, a mobile number of the user, the one or more payment options associated with the user, a type of the one or more payment options, a validity associated with the one or more payment options, or a transaction limit associated with the one or more payment options;
    updating configuration information comprising at least one of (a) the plurality of preferences associated with the user or (b) the one or more offers associated with the one or more payment options associated with the user based on a user input; and storing the registration information and the configuration information in a storage medium communicatively coupled with the server.

10. The method of claim 1, wherein the identified combination of the one or more payment options includes cash.

\* \* \* \* \*